(12) United States Patent
Mamigonians

(10) Patent No.: US 11,313,823 B2
(45) Date of Patent: Apr. 26, 2022

(54) METHOD OF EXAMINING THE ELECTRICAL PROPERTIES OF OBJECTS USING ELECTRIC FIELDS

(71) Applicant: Zedsen Limited, London (GB)

(72) Inventor: Hrand Mami Mamigonians, London (GB)

(73) Assignee: ZEDSEN LIMITED, London (GB)

( * ) Notice: Subject to any disclaimer, the term of this patent is extended or adjusted under 35 U.S.C. 154(b) by 776 days.

(21) Appl. No.: 16/185,447

(22) Filed: Nov. 9, 2018

(65) Prior Publication Data

US 2019/0145923 A1    May 16, 2019

(30) Foreign Application Priority Data

Nov. 11, 2017    (GB) ..................... 1718678

(51) Int. Cl.
*G01N 27/22* (2006.01)
*G01N 27/04* (2006.01)

(52) U.S. Cl.
CPC ......... *G01N 27/226* (2013.01); *G01N 27/041* (2013.01); *G01N 27/221* (2013.01)

(58) Field of Classification Search
CPC .................... G01N 27/04–24; G01L 1/14–148
See application file for complete search history.

(56) References Cited

U.S. PATENT DOCUMENTS

| | | | |
|---|---|---|---|
| 8,994,383 B2 | 3/2015 | Mamigonians | |
| 10,108,292 B2* | 10/2018 | Dorfner | G06F 3/0346 |
| 10,289,235 B2* | 5/2019 | King | G06F 3/0446 |
| 2010/0071459 A1* | 3/2010 | Kamm | G01L 1/146 73/304 C |
| 2014/0118010 A1 | 5/2014 | Fan et al. | |
| 2014/0152327 A1* | 6/2014 | Erkens | H03K 17/955 324/679 |
| 2014/0361793 A1 | 12/2014 | Marashdeh et al. | |
| 2014/0361795 A1* | 12/2014 | Burger | G01R 1/30 324/672 |
| 2015/0177314 A1* | 6/2015 | Tran | G01N 27/02 324/756.05 |
| 2015/0355746 A1* | 12/2015 | Hoch | G06F 3/044 345/174 |

FOREIGN PATENT DOCUMENTS

| | | |
|---|---|---|
| DE | 102016109102 B3 | 10/2016 |
| GB | 2214640 A | 9/1989 |
| WO | 2010007096 A2 | 1/2010 |

OTHER PUBLICATIONS

Corresponding Great Britain Patent Application No. GB1718678.4, Search Report dated May 1, 2018.

* cited by examiner

*Primary Examiner* — Huy Q Phan
*Assistant Examiner* — David B Frederiksen
(74) *Attorney, Agent, or Firm* — Cooper Legal Group, LLC

(57) ABSTRACT

The electrical properties of objects are examined, using electric fields. An object is arranged on an apparatus having a first electrode (201) and a second electrode (202). The first electrode is energised during a first strobing operation of a scanning-cycle and the second electrode is monitored during this first strobing operation. Thereafter, during a second strobing operation, the second electrode is energised and the first electrode is monitored.

11 Claims, 16 Drawing Sheets

METHOD OF EXAMINING THE ELECTRICAL PROPERTIES OF OBJECTS USING ELECTRIC FIELDS

CROSS REFERENCE TO RELATED APPLICATIONS

This application claims priority from United Kingdom Patent Application number 1718678.4, filed on Nov. 11, 2017, the whole contents of which are incorporated herein by reference.

BACKGROUND OF THE INVENTION

The present invention relates to a method of examining electrical properties of objects using electric fields.

It is known to examine electrical properties of objects using electric fields, as described in U.S. Pat. No. 8,994,383, assigned to the present applicant. Electrodes may be supported by a dielectric-membrane. A strobing-voltage may be applied to energise a first input electrode as a transmitter and an output voltage may be monitored on an output receiver electrode. An external electric field is generated that may pass through an object, such that an output signal will be influenced by electrical properties of the object, including the permittivity of the object. The output signal is usually sampled at a sample point during each strobing operation to facilitate digital processing.

A problem with known systems is that it can be difficult to obtain sufficient information to fully identify properties of an object.

BRIEF SUMMARY OF THE INVENTION

According to a first aspect of the present invention, there is provided a method of examining electrical properties of objects, using electric fields, comprising the steps of: arranging an object on an apparatus having a first-electrode and a second-electrode; energising said first-electrode during a first-strobing operation of a scanning-cycle; monitoring said second-electrode during said first-strobing operation; energising said second-electrode during a second-strobing operation of said scanning-cycle; and monitoring said first-electrode during said second-strobing operation.

Thus, in this way, the first-electrode is not dedicated as a transmitter electrode and the second-electrode is not dedicated as a receiver electrode. Each of these electrodes can perform both functions, thereby enhancing the amount of information that can be derived from the apparatus, without making significant modifications to the apparatus itself.

In an embodiment, additional electrodes are provided. The method may then further comprise the steps of energising all of the additional electrodes during respective strobing operations of the scanning cycle; and monitoring all of said additional electrodes at appropriate strobing operations of the scanning cycle.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art.

Components and processes distinguished by ordinal phrases such as "first" and "second" do not necessarily define an order or ranking of any sort.

DETAILED DESCRIPTION OF THE SEVERAL VIEWS OF THE DRAWINGS

FIG. 1

Figure 1:
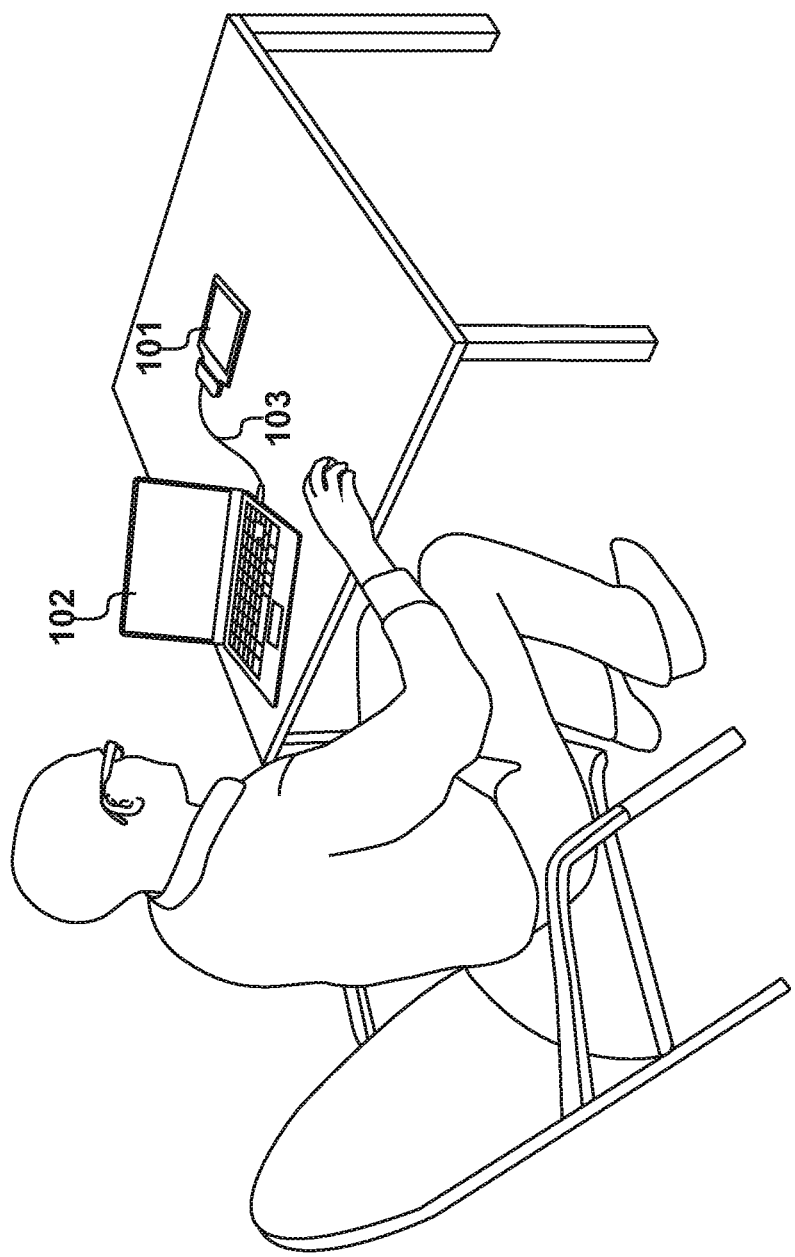
FIG. 1 shows an environment in which an examination-apparatus is deployed.

An examination apparatus 101 is shown in FIG. 1 for examining electrical properties of objects, using electric fields. The examination-apparatus 101 communicates with a data-processing-system 102 via a data-communication-cable 103, possibly designed in accordance with established USB protocols.

FIG. 2

Figure 2:
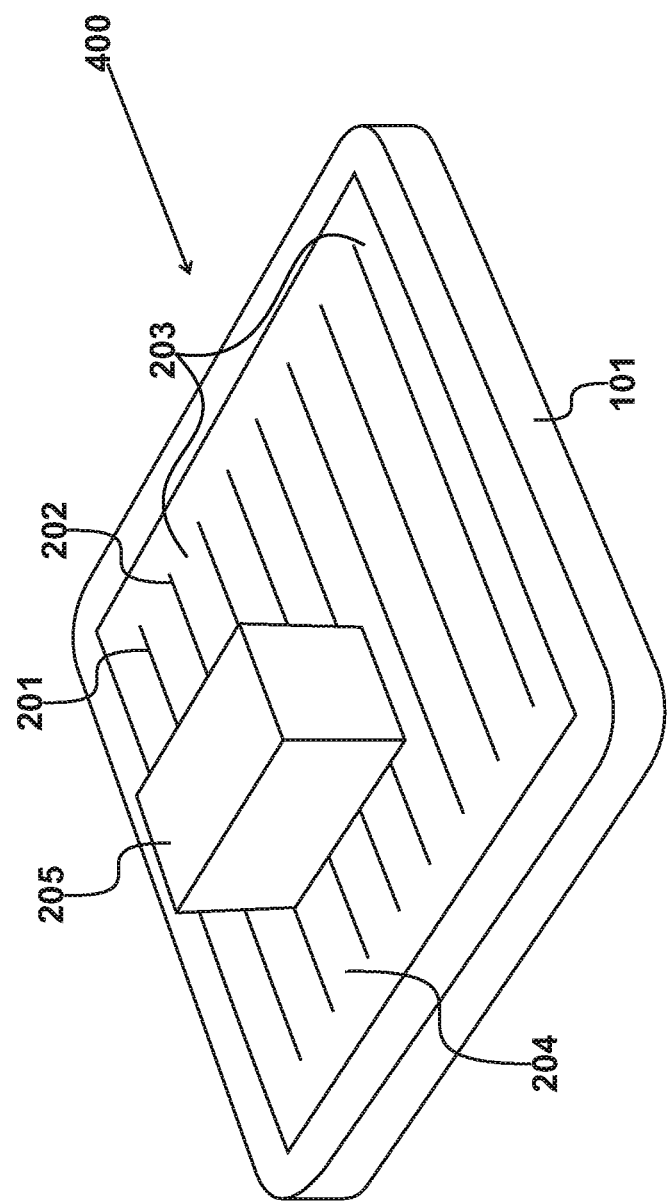
FIG. 2 details the examination-apparatus identified in FIG. 1.

The examination-apparatus 101 is shown in greater detail in FIG. 2. It includes a plurality of parallel electrodes, including a first-electrode 201 and a second-electrode 202, along with a plurality of additional electrodes 203. Electrodes 201 to 203 are supported by a dielectric insulating membrane 204 and the electrodes are then covered by an insulating material to ensure that the surface of the examination apparatus is non-conductive.

The examination apparatus 101 is arranged to examine the electrical properties of entities, such as an object 205. In known systems of the type illustrated in FIG. 2, electrodes have dedicated functionality; in that they are either energised, to provide a transmitter electrode, or monitored to provide a receiver electrode. Thus, in known systems, each electrode is identified exclusively as a dedicated input electrode or a dedicated output electrode. The present embodiment provides an apparatus in which a first-electrode 201 is configured to be energised during a first strobing operation of a scanning cycle and a second electrode 202 is configured to be monitored during this first strobing operation. Thus, in conventional systems, the first-electrode 201 would be dedicated as a transmitter electrode and the second electrode 202 would be dedicated as a receiver electrode. However, in accordance with the present invention, during part of the same scanning cycle, the second electrode 202 is configured to be energised during a second strobing operation and the first electrode 201 is configured to be monitored during this second strobing operation. Thus, within the same overall scanning cycle, data is obtained by using the first electrode 201 as a transmitter and the second electrode 202 as a receiver. Subsequently, these roles are reversed, such that additional data is received by energising the second electrode 202 as the transmitter, with the first electrode 201 being scanned as a receiver. To achieve this, additional electronics are required and operations performed by a microcontroller must ensure that any one electrode is not energised and scanned simultaneously as part of the same strobing operation.

In an embodiment, as illustrated in FIG. 2, the additional electrodes 203 are also configured to be energised during respective strobing operations, such that the first electrode 201, the second electrode 202 and the additional electrodes are all configured to be monitored at appropriate strobing operations of a scanning cycle.

FIG. 3

Figure 3:
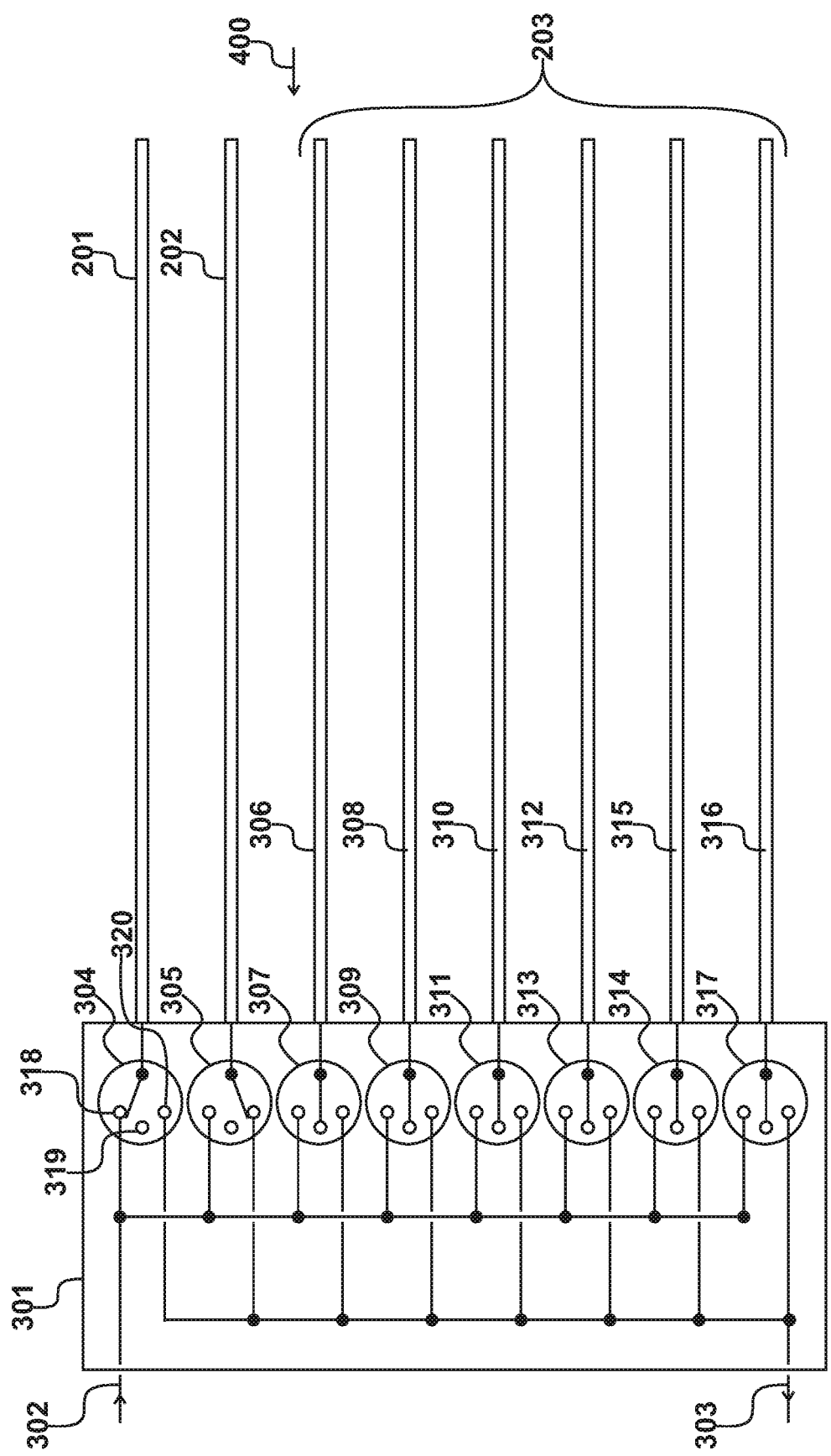
FIG. 3 shows a schematic representation of the functionality of the apparatus shown in FIG. 2.

In the embodiment of FIG. 2, the first electrode 201, the second electrode 202 and the plurality of additional electrodes 203 define substantially parallel tracks, as shown schematically in FIG. 3. Electric fields are generated between adjacent ones of said tracks, as will be described with reference to FIG. 4. Alternative arrangements of tracks are possible, an example of which will be described with reference to FIG. 16.

As used herein, a scanning-cycle consists of unique sequential strobing operations performed in a particular order. During an examination, the scanning cycle may be repeated and characteristics of the scanning cycle may be adjusted. However, without making any adjustments of this type, the cycle is repeated periodically at a rate primarily determined by electrical characteristics of the examination apparatus 101, clock speed and the number of strobing operations performed within each cycle. In this embodiment, a strobing operation consists of energising a selected electrode to generate an electric field. This in turn capacitively couples to other electrodes; such that the scanning operation is completed by selecting an adjacent electrode to be monitored. This provides an output signal that is sampled and then processed within the digital domain.

As previously stated, known apparatus dedicate each electrode to being either an input (transmitter) electrode or an output (receiver) electrode. In accordance with an embodiment of the present invention, any electrode 201 to 203 can be selected to receive an energising signal or can be selected to be monitored and thereby produce an output signal.

A schematic representation for achieving this functionality is illustrated by a switching device 301. The switching device 301 receives input energising signals on an input line 302. Similarly, the switching device 301 provides output signals on an output line 303.

The first electrode 201 is connected to a first switch 304 within the switching device 301. Similarly, the second electrode 202 is connected to a second switch 305. In this embodiment, a third electrode 306, of the additional electrodes 203, is connected to a third switch 307. A fourth electrode 308 is connected to a fourth switch 309. A fifth electrode 310 is connected to a fifth switch 311 and a sixth electrode 312 is connected to a sixth switch 313. Similarly, a seventh switch 314 connects to a seventh electrode 315, with an eighth electrode 316 being connected to an eighth switch 317.

Each of switches 304, 305, 307, 309, 311, 313, 314 and 317 includes a first contact 318, a second contact 319 and a third contact 320. For each of the switches, the first contact 318 is connected to the input line 302. Similarly, the third contact 320 is connected to the output line 303. The second contact 319, positioned between the first contact 318 and the third contact 320, does not provide a connection at all and, in this embodiment, presents an open circuit to its respective electrode such that, in the terminology of the art, the electrode is left floating when connected to the second contact 319. In an alternative embodiment, the second contact 319 may be connected to ground.

In the configuration shown in FIG. 3, the first switch 304 connects the input line 302 to the first electrode 201 such that, during the next strobing operation, the first electrode 201 will be energised. Furthermore, in the configuration of FIG. 3, the third contact 320 of the second switch 305 connects the second electrode 202 to the output line 303. Thus, during a strobing operation identified above, the second electrode 202 will be monitored while the first electrode 201 is energised. A schematic representation of this strobing operation, when viewed in the direction of arrow 400, is illustrated in FIG. 4.

FIG. 4

Figure 4:
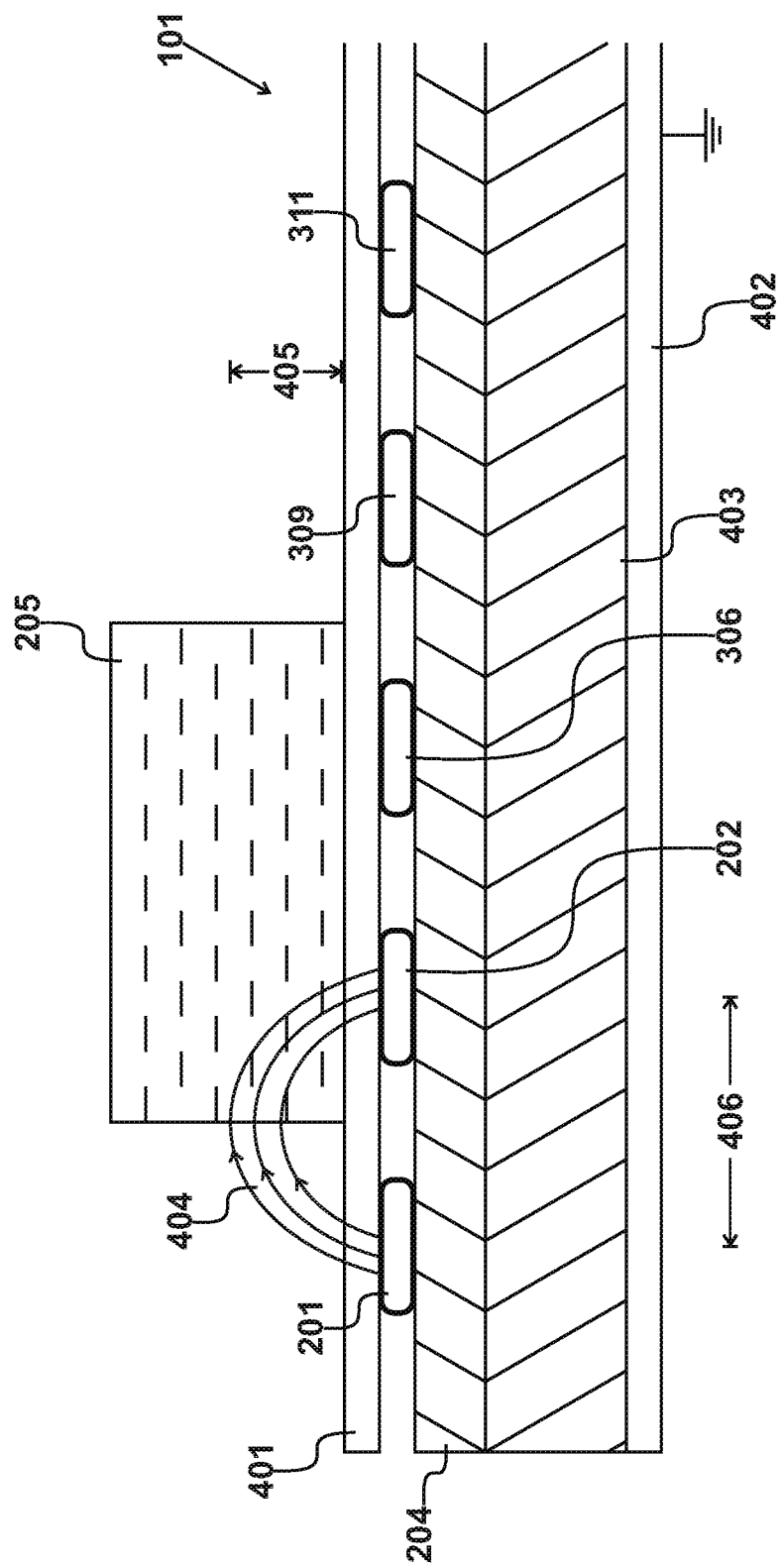
FIG. 4 illustrates the generation of electric fields.

A cross-sectional view of the examination apparatus of FIG. 2 is illustrated in FIG. 4, when viewed in the direction of arrow 400 (of FIG. 3). The object 205 has been placed on the examination apparatus 101. The first electrode 201 is shown in cross-section, along with the second electrode 202, the third electrode 306, the fourth electrode 309 and the fifth electrode 311. In the embodiment, the apparatus extends to the right to include electrodes 313, 314 and 317. The first electrode 201, the second electrode 202 and the additional electrodes are supported by the dielectric membrane 204. This is in turn covered by an insulating coating 401, thereby insulating the electrodes 201, 202 etc. from the object 205.

A conducting ground plane 402 is provided to shield the apparatus from external electrical noise. An intermediate layer 403 is also provided between the dielectric membrane 204 and the ground plane 402 that, in an embodiment, may include response enhancement properties.

During a strobing operation, an electric field is produced between the first electrode 201 and the second electrode 202, as illustrated by electric field lines 404. These represent capacitive coupling, that occurs given that the first electrode 201 is providing the functionality of a transmitter electrode and the second electrode 202 is providing the functionality of a receiver electrode. During a strobing cycle, the first electrode 201 is energised and the second electrode 202 is monitored.

The electric field lines 402 show that the electric field penetrates the object 205. A useful depth of penetration is indicated at 405. The distance between the electrodes is indicated at 406. Experiments conducted by the inventor suggest that the useful depth of penetration 405 is approximately half of the distance 406 between the electrodes.

FIG. 5

In this embodiment, for the next strobing operation of the scanning cycle, the first switch 304 is activated to connect the third contact 320 to the first electrode 201. Similarly, the second switch 305 is activated to connect the second electrode 202 to a second first-contact 501. Thus, in this configuration, electrode 202 now performs a transmitter function, with the first electrode 201 performing a receiver function.

FIG. 6

Figure 5:
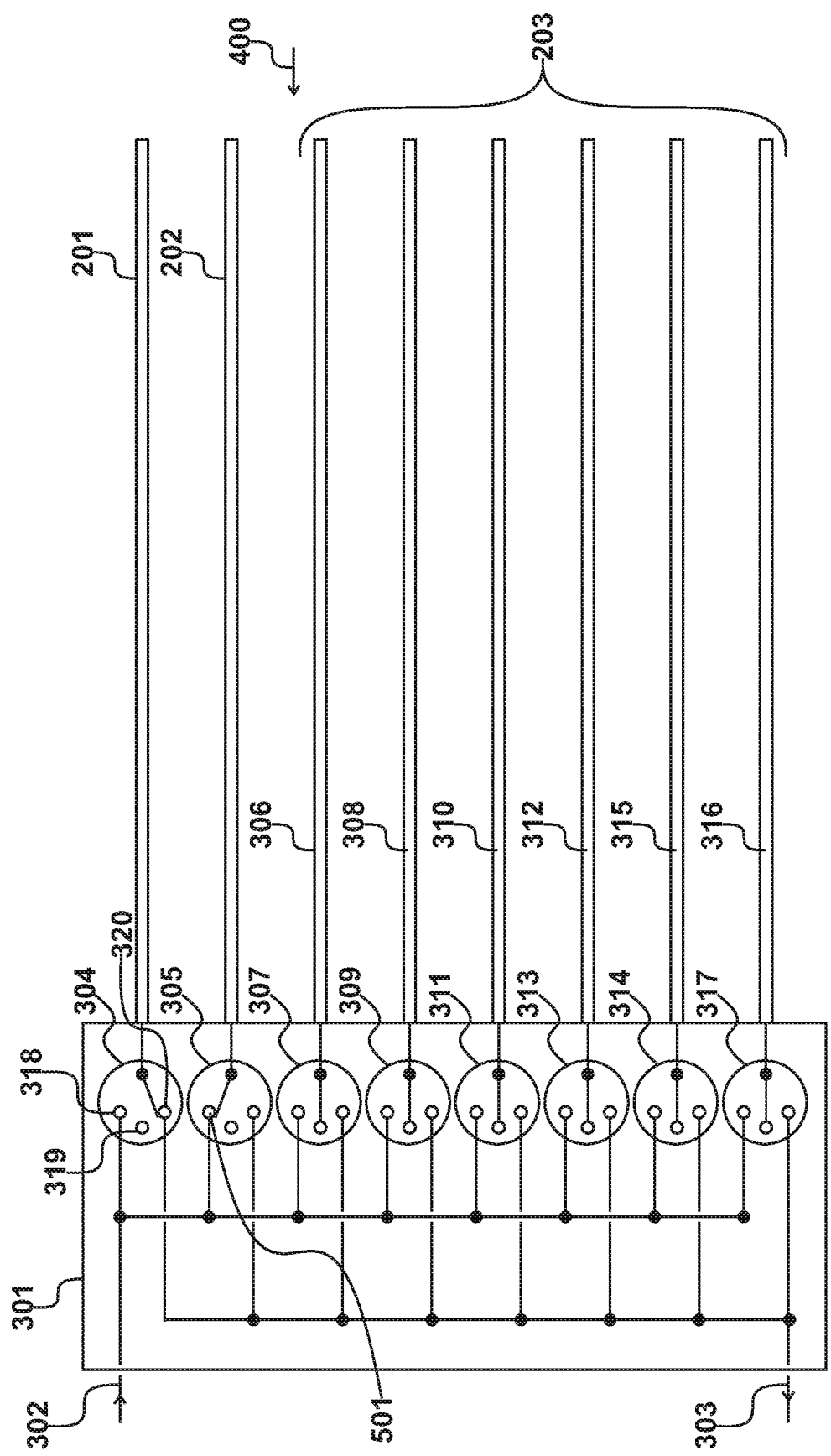
FIG. 5 shows an alternative configuration of the apparatus shown in FIG. 3.

The result of this switching operation, from the configuration of FIG. 3 to the configuration of FIG. 5, results in a reversal of functionality, such that the second electrode 202 becomes a transmitter and the first electrode 201 becomes a receiver.

Figure 6:
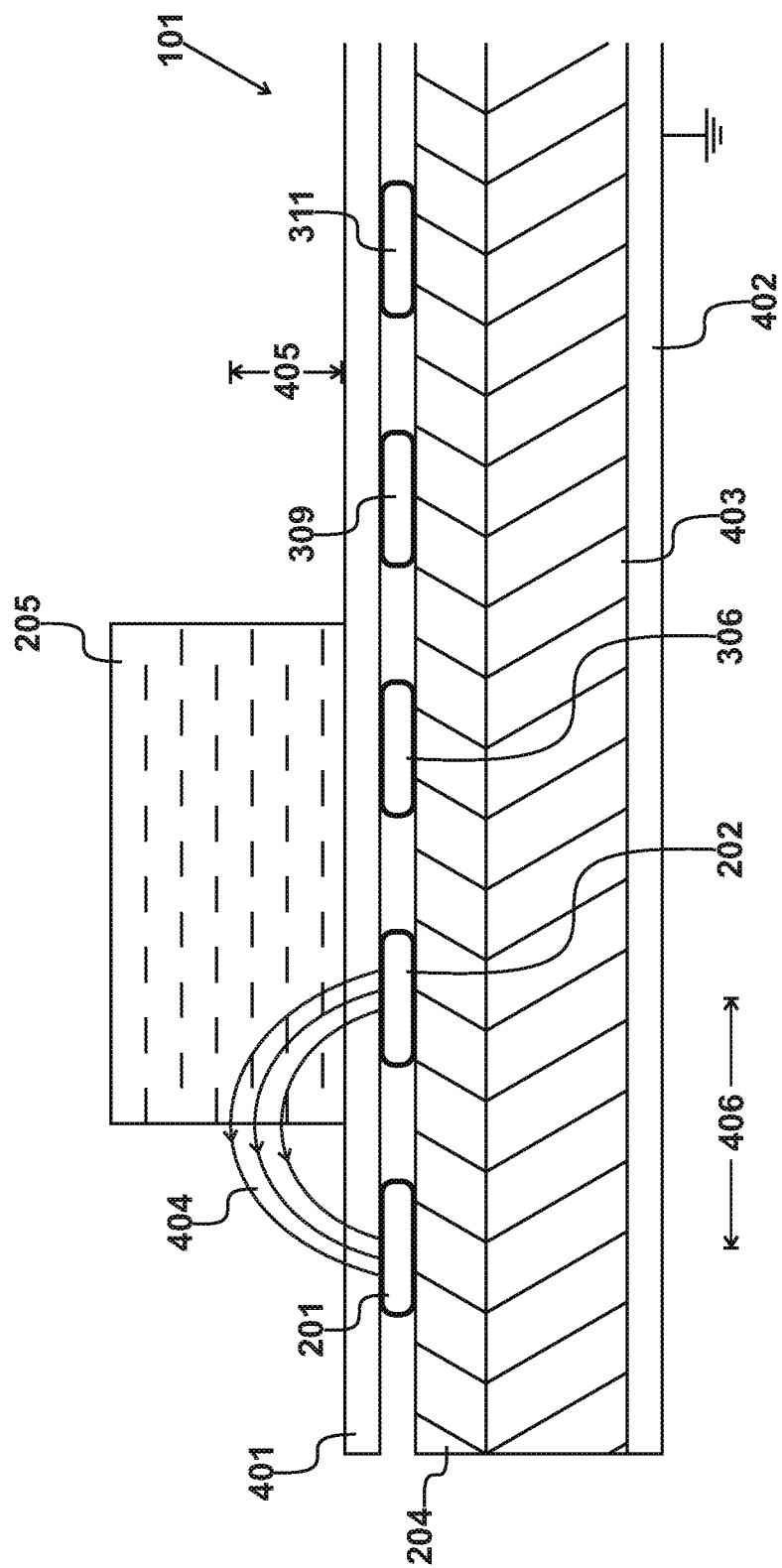
FIG. 6 illustrates electric fields generated in response to the configuration of FIG. 5.

Thus, as illustrated in FIG. 6, the direction of the electric field lines 404 has reversed.

FIG. 7

In this embodiment, for the next strobing operation, the first-switch 304 is activated, the second-switch 305 is activated and the third-switch 307 is activated. The first-switch 304 connects the first-electrode 201 to the second contact 319, such that the first electrode 201 will not contribute to the next strobing operation. Switch 305 remains in position, connected to the second first-contact 501, such that, again, the second electrode 202 will provide the functionality of a transmitter. However, on this strobing operation, the third-switch 307 has been activated to connect a third third-electrode 701 to the output line 303, thereby causing the third electrode 306 to provide the functionality of a receiver.

FIG. 8

Figure 7:
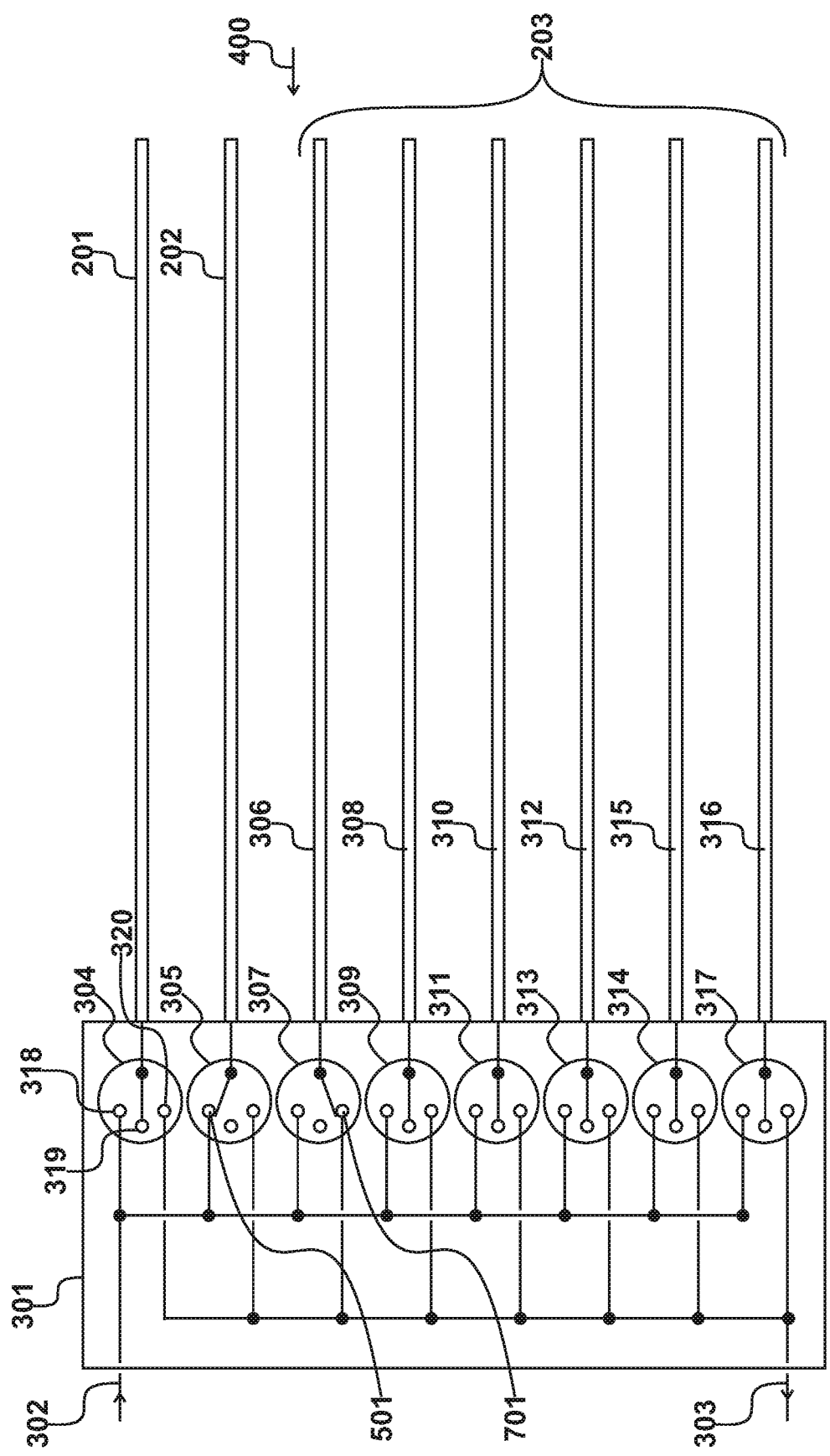
FIG. 7 shows an alternative configuration of the apparatus shown in FIG. 3 and FIG. 5.
Figure 8:
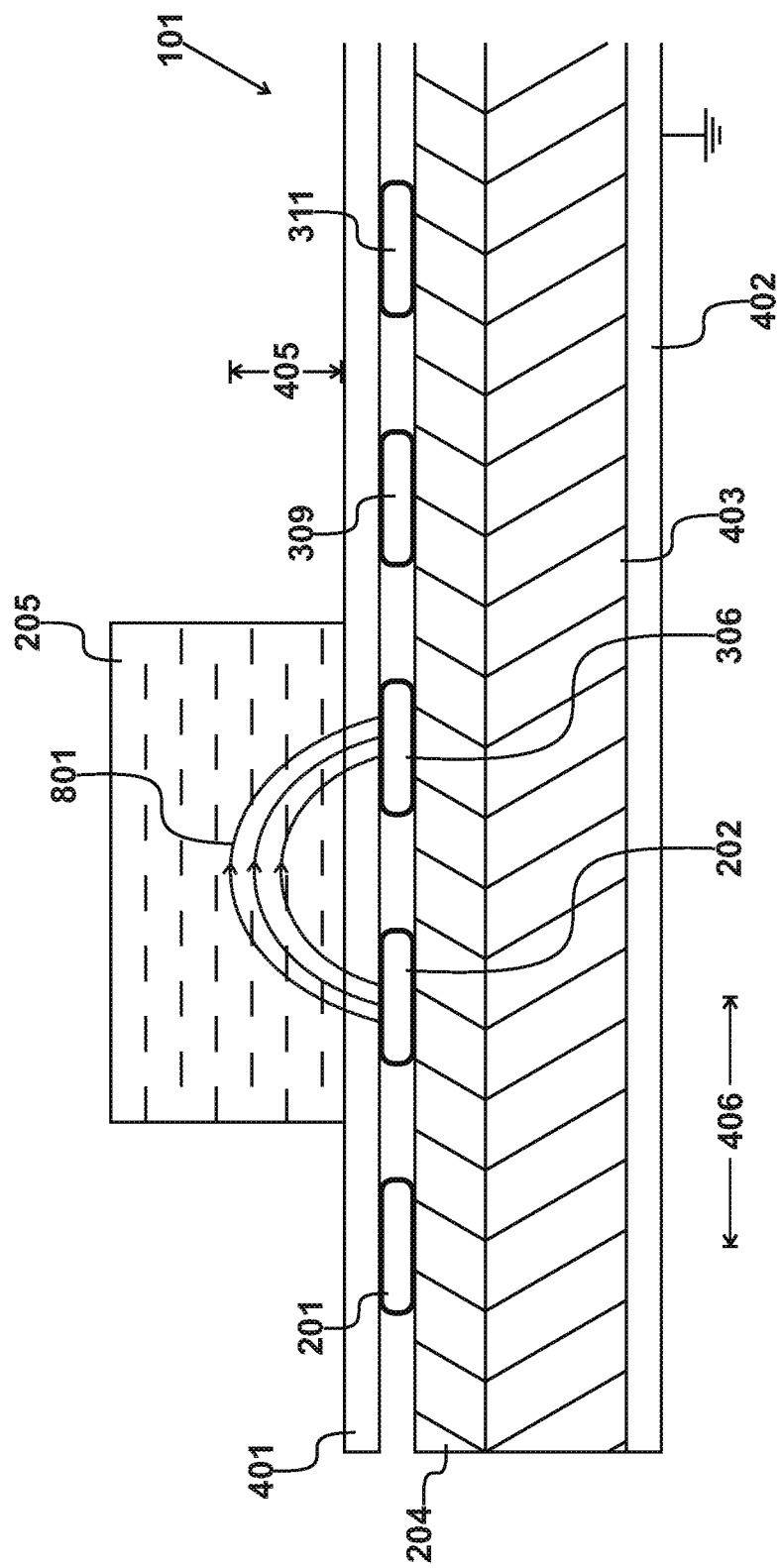
FIG. 8 shows resulting electric fields from the configuration of FIG. 7.

Upon initiating a strobing operation for the configuration described with reference to FIG. 7, an electric field 801 is generated, as illustrated in FIG. 8. Thus, the second electrode 202 provides transmitter functionality and the third electrode 306 provides receiver functionality.

Thus, in this embodiment, each electrode sequentially adopts the functionality of a transmitter. When given this functionality, a first strobing operation monitors an electrode immediately to the left, followed by a second strobing operation that monitors the electrode immediately to the right. The sequencing then advances and the roles of the electrodes are changed.

FIG. 9

Figure 9:
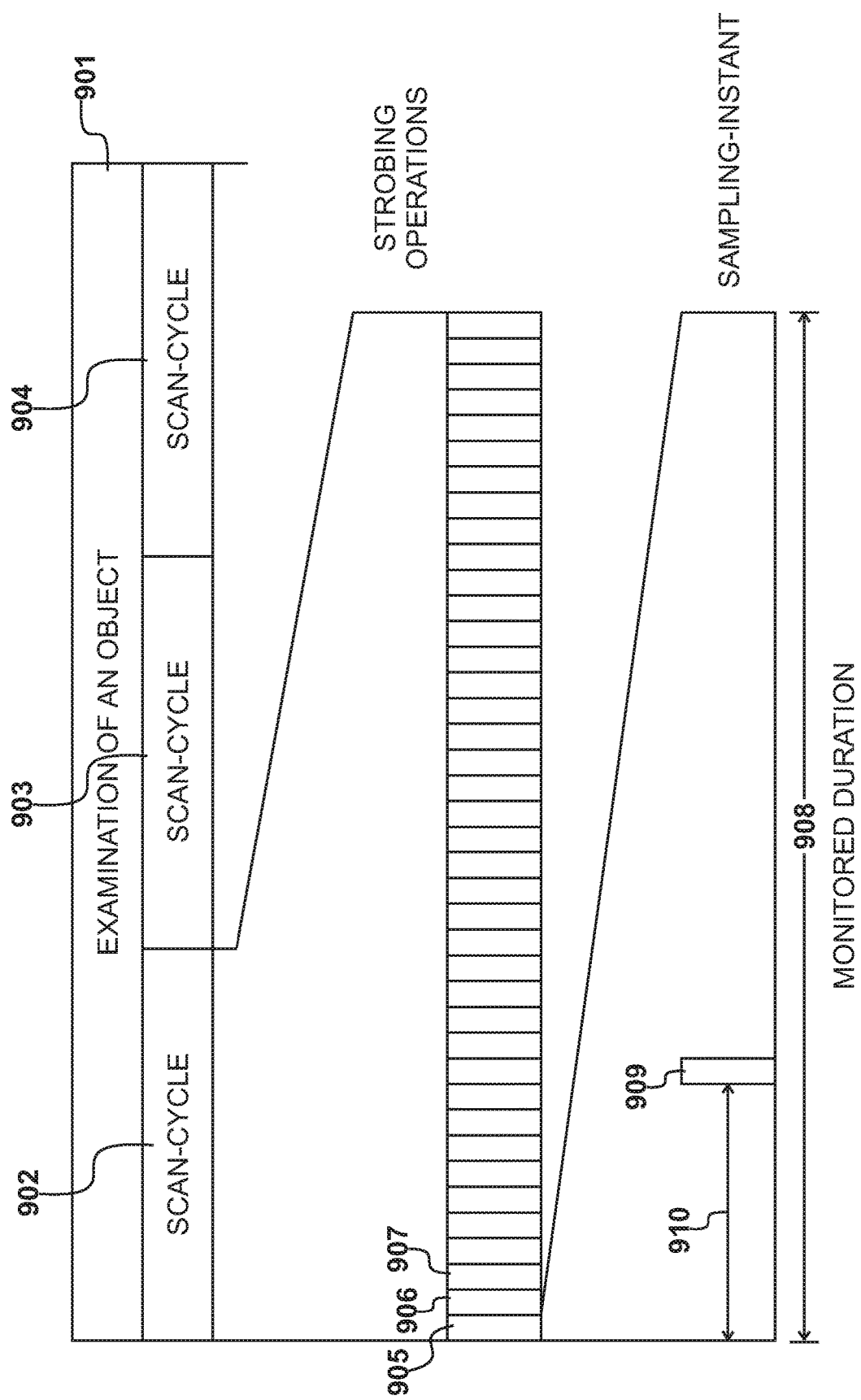
FIG. 9 illustrates an examination period.

During a working period, many objects may be examined. The duration of an examination is illustrated in FIG. 9. Similar procedures are performed for each object and a particular examination of an object starts by arranging the object on the apparatus, as described with reference to FIG. 2.

During an examination process 901, electrodes are energised sequentially and the procedure may be referred to informally as "scanning". As used herein, a complete scan cycle is performed when all unique combinations of transmitters and receivers have been exercised. Thus, during the examination 901, many scan cycles may be performed. For the purposes of this illustration, during examination procedure 901, a first scan cycle 902 is performed, followed by a similar second scan cycle 903 and a similar third scan cycle 904.

During each scan cycle, such as scan cycle 902, many strobing-operations are performed, including a first strobing operation 905, a second strobing operation 906, and a third strobing operation 907 etc. Each strobing operation is unique, in terms of the particular electrode selected as the transmitter in combination with the particular electrode selected as the receiver. Each strobing operation consists of energising the selected transmitter electrode and monitoring the selected receiver electrode.

Due to capacitive coupling, each monitoring process monitors a voltage at the receiver electrode. To determine electrical properties of objects, a measurement is required. In a preferred embodiment, this measurement is achieved by performing a process of analog to digital conversion, thereby allowing the result of this conversion to be processed within the digital domain.

In FIG. 9, strobing operation 905 takes place within a monitored duration 908. Within the monitored duration 908, a sampling instant 909 occurs, representing an instant within the monitored duration at which an output voltage is sampled.

In order to optimise results received from the examination process, the sampling instant does not occur immediately following the generation of an input strobing signal. Although, in an embodiment, a sharp, rapidly-raising strobing input signal is supplied to the transmitters, the shape of resulting output signals will not rise so steeply; as a result of the electrical properties of the device and the electrical properties of the objects. Thus, to optimise the value of the information derived from the procedure, the sampling instant 909 is delayed by a predetermined delay period 910.

FIG. 10

Figure 10:
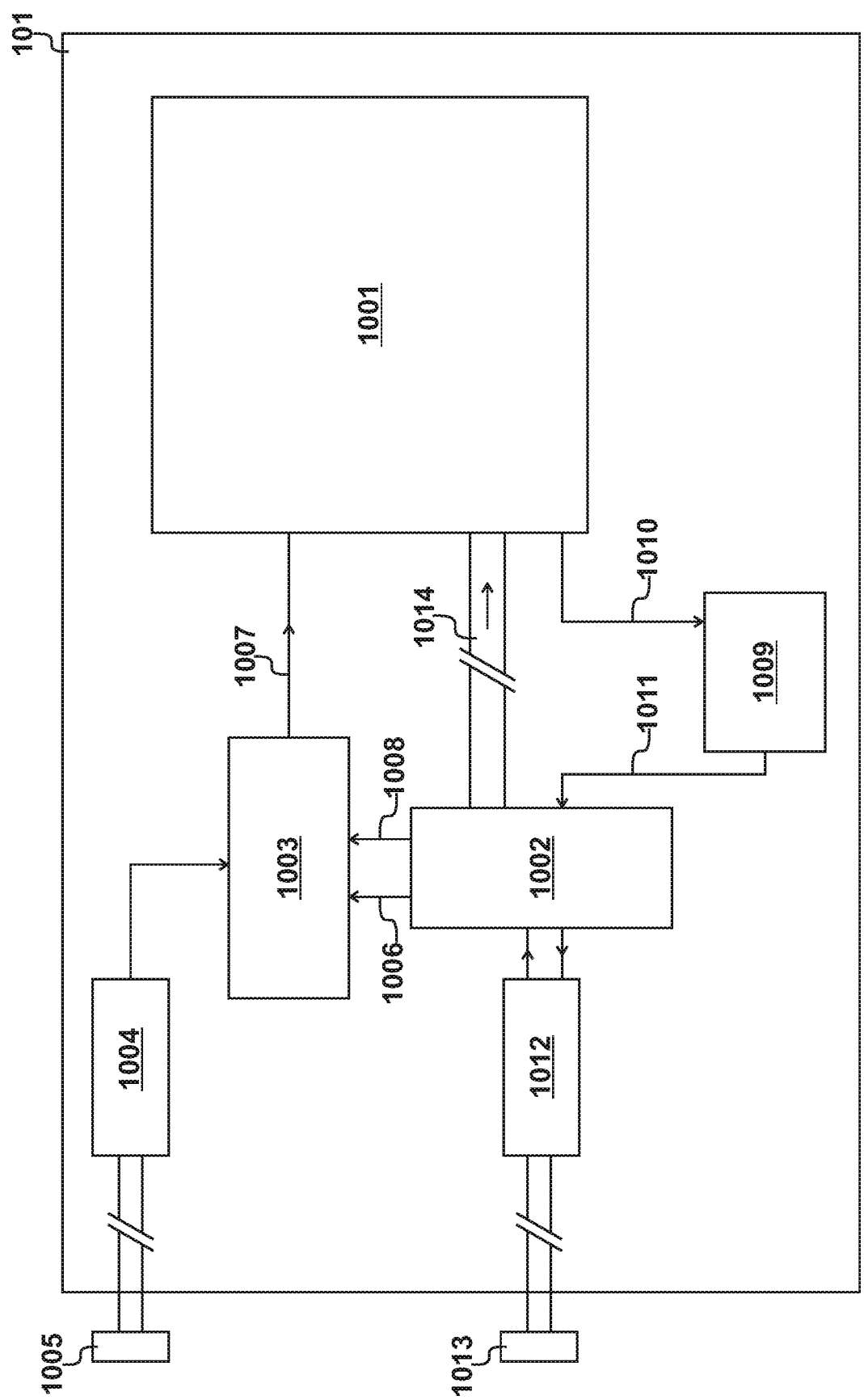
FIG. 10 shows a schematic representation of the examination apparatus shown in FIG. 2.

A schematic representation of the examination apparatus 101 is illustrated in FIG. 10. This provides an apparatus for examining electrical properties of objects, using electric fields. A number of substantially parallel electrodes are supported on a dielectric membrane, as described with reference to FIG. 2. In the representation of FIG. 10, the dielectric membrane, with parallel electrodes, is included within a multiplexing environment 1001. In addition to the dielectric membrane, the multiplexing environment 1001 includes a de-multiplexer for selectively de-multiplexing multiplexed energising input voltage pulses for application to each of the electrodes, along with a multiplexer for selectively multiplexing output signals monitored from each of the electrodes, as described with reference to FIG. 12.

A processor 1002, implemented as a microcontroller, controls the de-multiplexer and the multiplexer to ensure that the same electrode cannot both be energised and monitored during a strobing operation.

An energising circuit 1003 is energised by a power supply 1004 that in turn may receive power from an external source via a power input connector 1005. A voltage control line 1006 from (a digital to analog convertor within) the processor 1002 to the energising circuit 1003 allows the processor 1002 to control the voltage (and hence energy) of energising signals supplied to the multiplexing environment 1001, via a strobing line 1007. The timing of each strobing signal is controlled by the microcontroller 1002 via a trigger-signal line 1008.

An output from the multiplexing environment 1001 is supplied to an analog processing circuit 1009 over a first analog line 1010. A conditioning operation is performed by the analog processing circuit 1009, allowing analog output signals to be supplied to the microcontroller 1002 via a second monitoring line 1011. The processor 1002 also communicates with a two way data communication circuit 1012, thereby allowing a data interface 1013 to connect with the data communication cable 103.

In operation, the processor 1002 supplies addresses over address busses 1014 to the multiplexing environment 1001 in order to achieve the functionality described with reference to FIGS. 3 to 8. Thus, having supplied addresses to the multiplexing environment 1001, a strobing-voltage is supplied via strobing line 1007, resulting in an output signal being supplied to the processor 1002. At the processor 1002, an analog input signal is sampled to produce a digital representation and, in an embodiment, this digital data is uploaded to the data-processing system 102 via the data interface 1013.

FIG. 11

Figure 11:
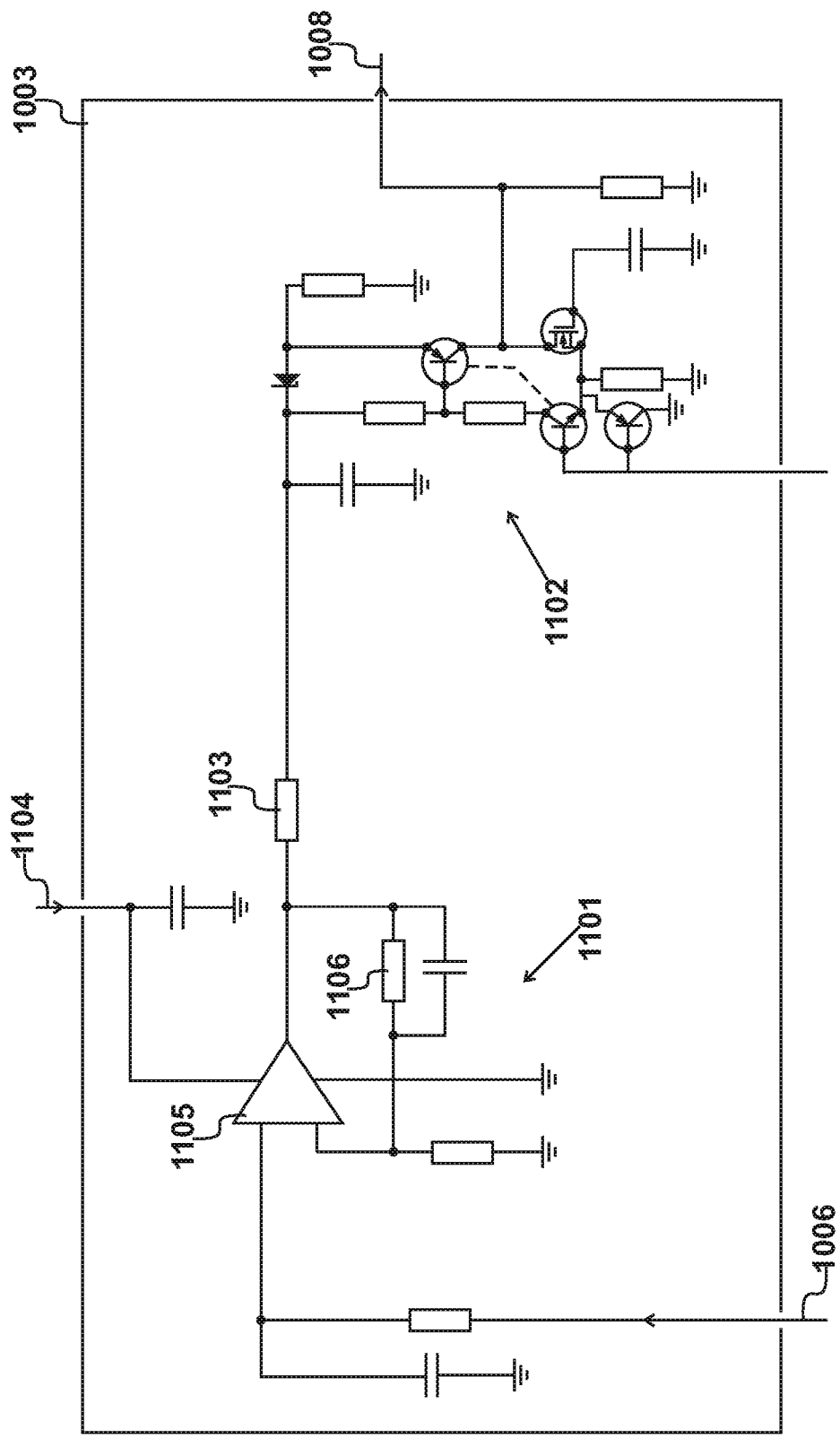
FIG. 11 shows a schematic representation of a strobing-circuit of the type identified in FIG. 9.

An example of the energising circuit 1003 is shown in FIG. 11. The energising circuit 1003 consists of a voltage control circuit 1101 connected to a strobing circuit 1102 via a current limiting resistor 1103.

A voltage input line 1104 receives energising power from the power supply 1004 to energise an operational amplifier 1105. The operational amplifier 1105 is configured as a comparator and receives a reference voltage via feedback resistor 1106. This is compared against a voltage control signal, received on the voltage control line 1006, to produce an input voltage for the strobing circuit 1102.

In the embodiment of FIG. 11, the strobing circuit 1102 includes two bipolar transistors configured as a Darlington pair, in combination with a MOSFET. This creates strobing pulses with sharp rising edges and sharp falling edges that are conveyed to the strobing line 1008.

FIG. 12

Figure 12:
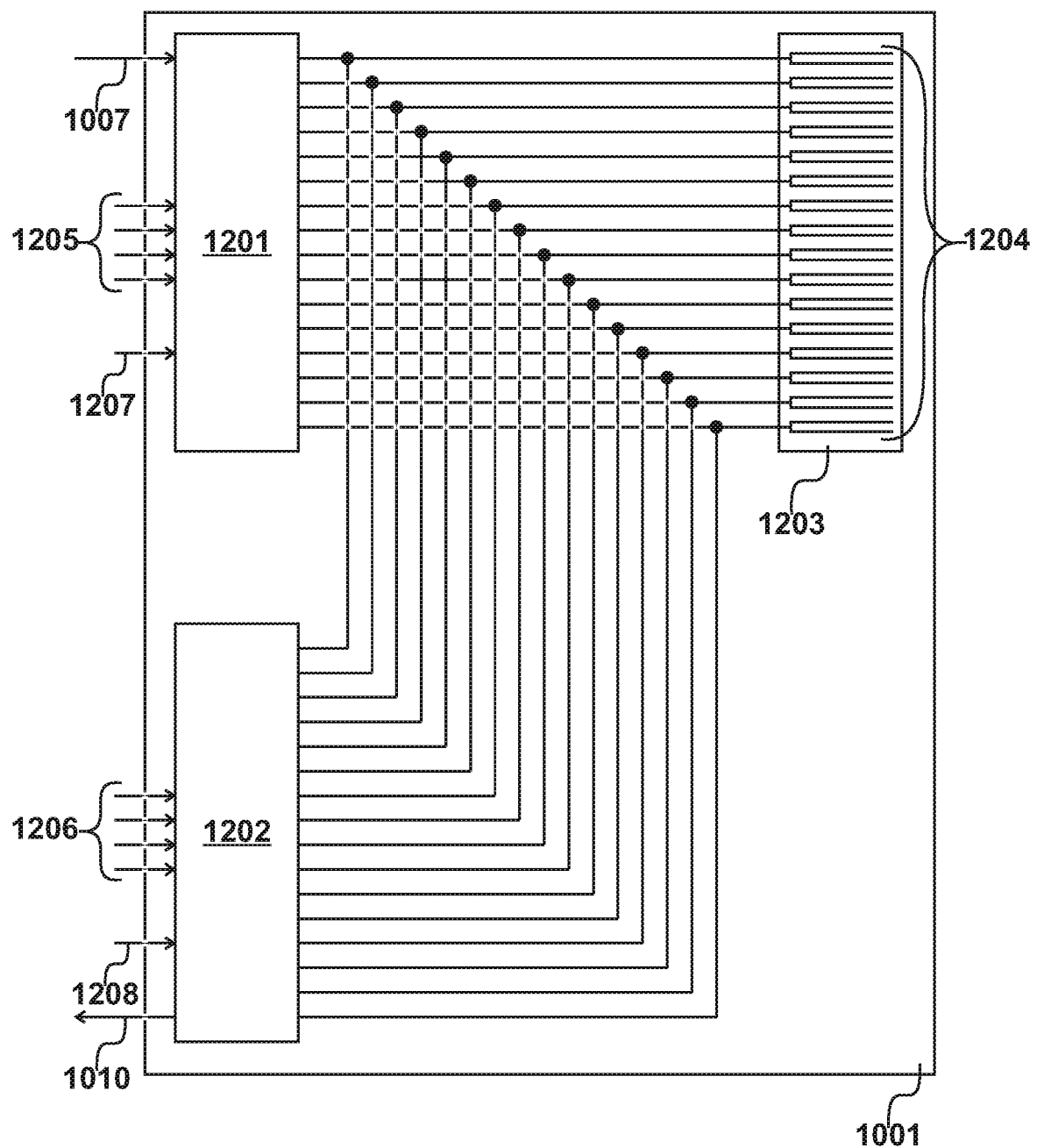
FIG. 12 shows an example of a multiplexing environment of the type identified in FIG. 10.

An example of a multiplexing environment 1001 is detailed in FIG. 12. The switching functionality, described with reference to FIG. 3, is achieved by the provision of a first multiplexing device 1201 and a second multiplexing device 1202. In this alternative embodiment, a dielectric membrane 1203 supports sixteen parallel electrodes 1204.

The address busses 1014 include an input address bus 1205 and an output address bus 1206, for addressing the first multiplexing device 1201 and the second multiplexing device 1202 respectively. The addressing space for the input address bus 1205 and the output address bus 1206 may be similar, which may assist in terms of ensuring that the same address cannot be supplied simultaneously to both the input address bus 1205 and the output address bus 1206.

The first multiplexing device 1201 also includes a first enabling line 1207. Similarly, the second multiplexing device 1202 includes a second enabling line 1208. In operation, addresses are supplied to the input address bus 1205 and to the output address bus 1206 but line selection does not actually occur until the multiplexing devices receive a respective enabling signal.

The first multiplexing device 1201 receives an input pulse from the energising circuit 1003 via the strobing line 1008. Multiple strobing operations are performed, such that an input energising voltage is supplied sequentially to electrodes performing a transmitter function. Strobing signals are distributed to multiple inputs; therefore, the first multiplexing device 1201 should be seen as performing a de-multiplexing operation.

The second multiplexing device 1202 performs a multiplexing operation, in that multiple output signals are selected sequentially and then combined onto the first monitoring line 1010 for reception by the monitoring circuit 1009. Thus, in this embodiment, the multiplexing environment is established by a single first multiplexing device for input signals and a single second multiplexing device for output signals, both of which are connected to all sixteen of the available electrodes. Furthermore, if a greater number of electrodes are present upon a dielectric-membrane, it is possible for additional multiplexing devices to be provided such that, for example, a pair of multiplexing devices may provide the input de-multiplexing function and a further pair of multiplexing devices may provide the multiplexing output function; provided that an appropriate addressing space has been established.

During a strobing operation, an input address is supplied on the input address bus 1205 and an output address is supplied on the output address bus 1206. The addresses are enabled such that, at a particular point in time, the output multiplexer 1202 is enabled and as such is then configured to monitor output signals on the addressed output electrodes. The selected input electrode is then energised by the application of a strobing pulse, which may be considered to occur at the start of arrow 910 shown in FIG. 9.

A short, predetermined delay, for the duration of arrow 910, occurs before the sampling instant 909 occurs; taking a sample of the voltage monitored on the output electrode. In this embodiment, the first monitoring line 1010 applies an output analog voltage to the analog processing circuit 1009 for the duration of the strobing operation, such as strobing operation 905. The analog voltage is conditioned by the analog processing circuit 1009, which in turn supplies a conditioned voltage to the processor 1002 via the second monitoring line 1011. Digital-to-analog conversion then takes place within the processor 1002, such that the point at which the sampling instant 909 occurs is determined by the processor.

FIG. 13

Figure 13:
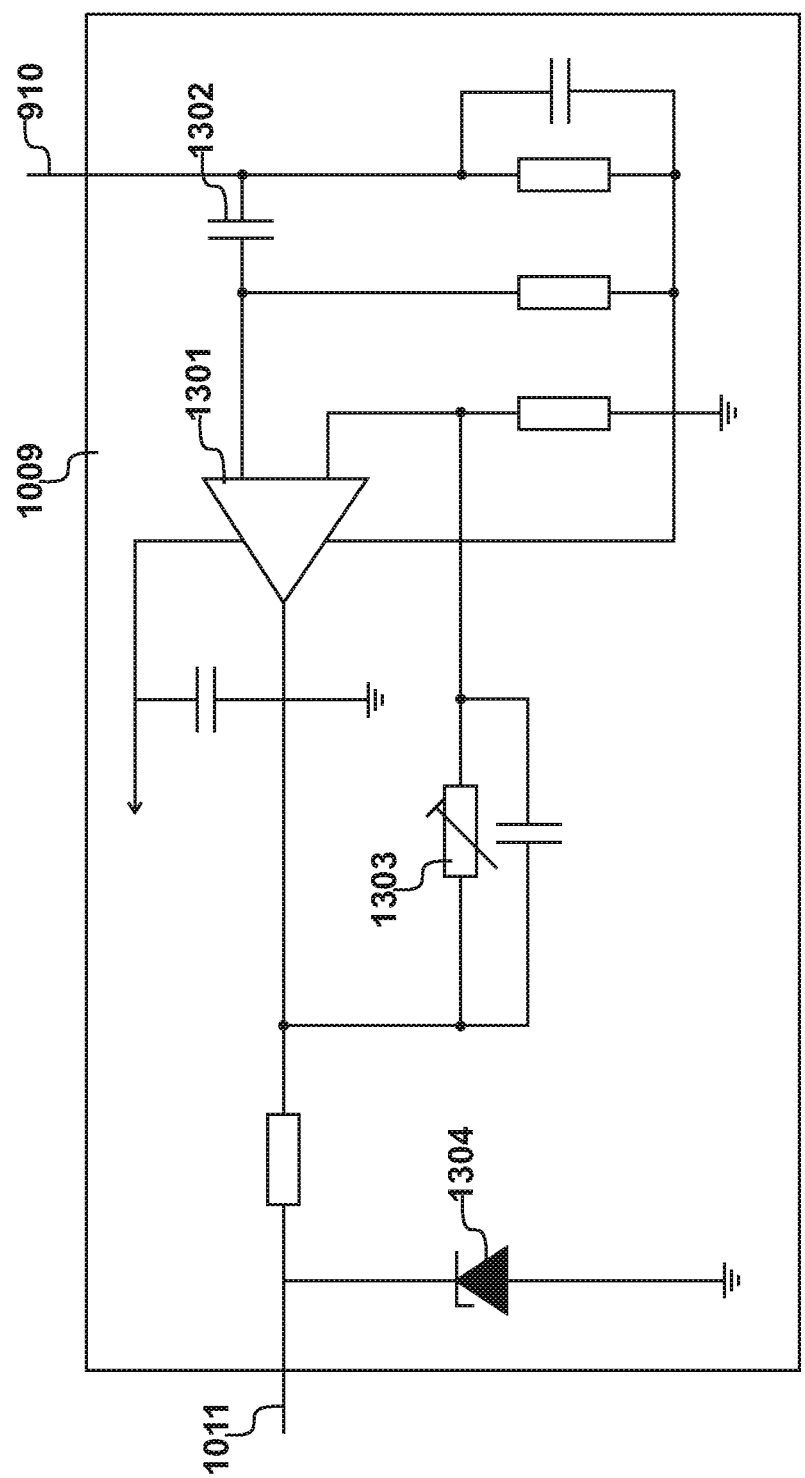
FIG. 13 shows an example of a monitoring-circuit of the type identified in FIG. 10.

An example of an analog processing circuit 909 is illustrated in FIG. 13. Signals received on the first monitoring line 1010 are supplied to a buffering amplifier 1301 via a decoupling capacitor 1302. During an initial set-up procedure, a variable feedback resistor 1303 is trimmed to optimise the level of monitored signals supplied to the processor 1002 via the second monitoring line 1011. A Zener-diode 1304 prevents excessive voltages being supplied to the processor 1002.

FIG. 14

Figure 14:
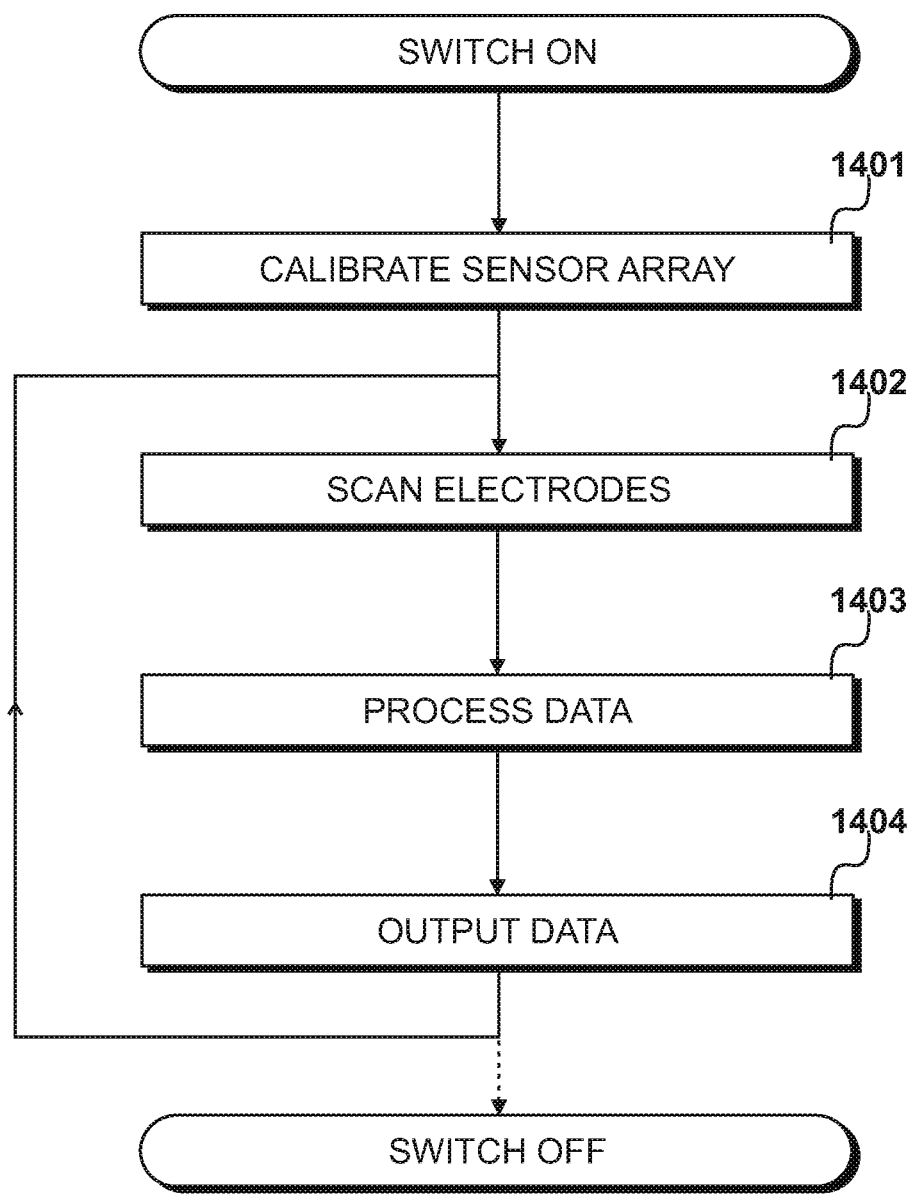
FIG. 14 shows an overview of procedures performed by the processor identified in FIG. 10.

An overview of procedures performed by the processor 1002 is illustrated in FIG. 14. After an initial switch-on, possibly initiated by the data processing system 102, the sensor array is calibrated at step 1401. This enables a reference level to be established, prior to the application of an object, such as object 205.

After the application of an object, the electrodes are scanned at step 1402. As previously described, each scan consists of a plurality of strobing operations with each strobing operation consisting of a unique combination of transmitter electrode and receiver electrode.

At step 1403, data is processed and the degree of local data processing will depend upon the processing capabilities provided by the processor 1002. In an embodiment, the level of received monitored signals may be compared against a reference and, where appropriate, a control voltage on the voltage control line 906 may be adjusted.

More sophisticated processing may be achieved by the data processing system 102, therefore the data is supplied as an output to the data processing system 102 at step 1404. Thereafter, further scanning is performed at step 1402 and the procedures are repeated until a de-energisation command is received.

FIG. 15

Figure 15:
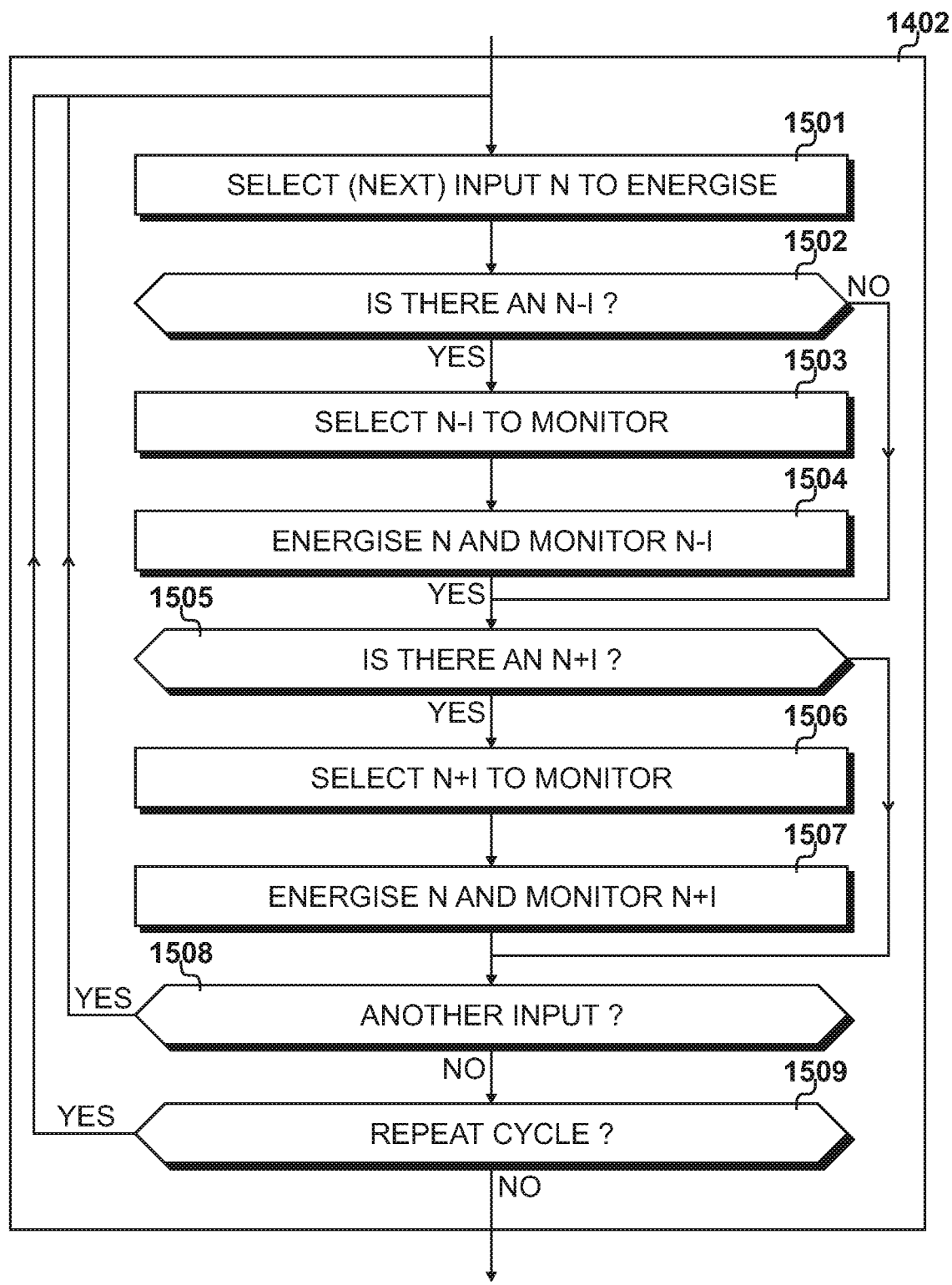
FIG. 15 details procedures for scanning electrodes identified in FIG. 14.

Procedures 1402 for scanning the electrodes are detailed in FIG. 15. At step 1501, an input electrode is selected; which would be the first electrode 201 on the first iteration. At step 1502 a question is asked as to whether there is an N minus one (N−1) electrode which, if present, is selected at step 1503. Thereafter, the input electrode N selected at step 1501 is energised and the electrode before it, N minus one, is monitored at step 1504.

On a first iteration, the first electrode will have been selected; therefore, an N minus one electrode does not exist. Consequently, the question asked at step 1502 will be answered in the negative.

At step 1505 a question is asked as to whether there is an N plus one electrode (N+1) which, when answered in the affirmative, results in a selection of this electrodes as a monitoring electrode at step 1506. Thus, at step 1507 electrode N is energised and electrode N plus one (N+1) is monitored. On the first iteration, an N plus one electrode is present, therefore the energisation at step 1507 is as illustrated in FIG. 4, with the first electrode 201 being a transmitter and the second electrodes 202 being a receiver. Thus, output data is generated.

Thereafter, a question is asked at step 1508 as to whether another input electrode is present which, when answered in the affirmative, results in the next input being selected at step 1501. In this example, this will result in the second electrode 202 being selected at step 1501 and the question then asked at step 1502 will be answered in the affirmative, given that the first electrode 201 will now be selected as the N minus one (N−1) electrode. Consequently, the second electrode 202 is energised and the first electrode 201 is monitored, as illustrated in FIG. 6.

Thereafter, at step 1505 a question is asked as to whether there is an N plus one (N+1) electrode, which would be answered in the affirmative; resulting in the third electrode 306 being selected at step 1506. Consequently, at step 1507, the second electrode 202 will be energised and the third electrode 306 will be monitored, as illustrated in FIG. 8. Thereafter, the question asked at step 1508 will be answered in the affirmative and the process will be repeated, this time with the third electrode 306 being the energised transmitter electrode N.

Thus, the question asked at step 1508 will continue to be answered in the affirmative until all of the electrodes have been selected. This will result in the establishment of a complete cycle such that, at step 1509, a question is asked as to whether the cycle is to repeat. When answered in the affirmative, the first electrode is selected again at step 1501.

The procedure provides a method of examining electrical properties of objects, using electric fields. An object is arranged on an apparatus having a first electrode and a second electrode, as described with reference to FIG. 2. The first electrode is energised during a first strobing operation of a scanning cycle and a second electrode is monitored during this first strobing operation. Usually, this would establish electrodes as being specifically dedicated for a transmitting operation or a reception operation. However, by providing a sophisticated multiplexing environment, as described with reference to FIG. 12, it is possible to then energise the second electrode during a second strobing operation, while monitoring the first electrode during this second strobing operation; as part of the same scanning cycle.

FIG. 16

Figure 16:
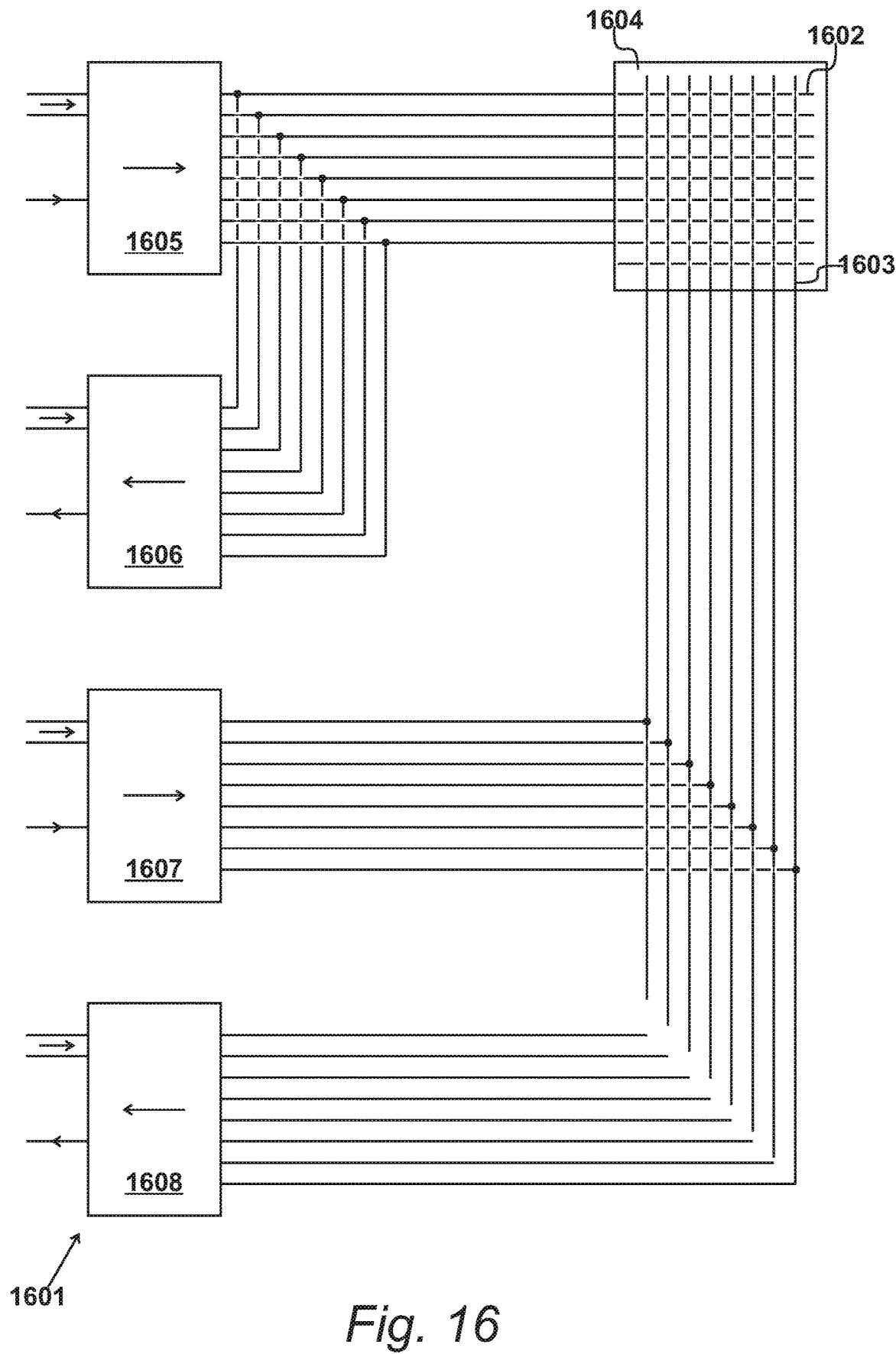
FIG. 16 shows an alternative-examination-apparatus.

An alternative examination apparatus 1601 is shown in FIG. 16. A first electrode 1602 and a first plurality of additional electrodes provide a first set of substantially parallel tracks; substantially similar to the arrangement described with respect to FIG. 12. However, the second electrode 1603 and a second plurality of electrodes provide a second set of substantially parallel tracks; where both sets of tracks are mounted on opposite sides of a dual-sided membrane 1604.

The second set of electrodes, including second electrode 1603, is substantially orthogonal to the first set of electrodes, including the first electrode 1602, and electrically insulated therefrom. The first electrode and the first plurality of electrodes are energised (sequentially) while the second electrode and the second plurality of electrodes are sequentially monitored. Thereafter, the second electrode and the second plurality of electrodes are energised while the first electrode and the first plurality of electrodes are monitored.

A first alternative multiplexing device 1605 supplies energising signals to the first set of electrodes. A second alternative multiplexing device 1606 receives output signals from the first set of electrodes. Similarly, a third alternative multiplexing device 1607 supplies energising signals to the second set of electrodes and a fourth alternative multiplexing device 1608 receives output signals from the second set of electrodes.

During a scanning cycle, the first alternative multiplexing device 1605 is operative, in combination with the fourth alternative multiplexing device 1608, such that, for part of the cycle, the first set of electrodes are energised and the second set of electrodes are scanned. Thereafter, as part of the same cycle, the third alternative multiplexing device 1607 is energised; thereby energising the second set of electrodes and the second alternative multiplexing device 1606 is addressed.

The invention claimed is:

1. A method of examining electrical properties of objects, using electric fields, comprising the steps of:
arranging an object on an apparatus having a first electrode, a second electrode, and a plurality of additional electrodes;
energising said first electrode during a first strobing operation of a scanning cycle;
monitoring said second electrode during said first strobing operation;
energising said second electrode during a second strobing operation of said scanning cycle;
monitoring said first electrode during said second strobing operation;
sequentially energising each of said additional electrodes during respective strobing operations of said scanning cycle; and
for a selected energized electrode N, monitoring, when electrode N-1 is present, the electrode N-1 and then monitoring, when electrode N+1 is present, the electrode N+1 during respective strobing operations of said cycle.

2. The method of claim 1, further comprising the step of analysing data produced by said monitoring steps after performing a complete scanning cycle.

3. The method of claim 2, further comprising the steps of:
modifying a scanning characteristic in response to said analysing step; and
conducting a further scanning cycle.

4. The method of claim 3, wherein said modifying step includes modifying said energising step.

5. The method of claim 3, in which each strobing operation includes the energising step and the monitoring step, wherein:
each said energising step includes applying an input voltage pulse to a selected input electrode; and
said monitoring step includes sampling an output voltage received on a selected output electrode.

6. The method of claim 2, in which each strobing operation includes the energising step and the monitoring step, wherein:
each said energising step includes applying an input voltage pulse to a selected input electrode; and
said monitoring step includes sampling an output voltage received on a selected output electrode.

7. The method of claim 2, wherein:
said electrodes define a plurality of parallel tracks; and
said electric fields extend between adjacent parallel tracks.

8. The method of claim 1, in which each strobing operation includes the energising step and the monitoring step, wherein:
each said energising step includes applying an input voltage pulse to a selected input electrode; and
said monitoring step includes sampling an output voltage received on a selected output electrode.

9. The method of claim 8, wherein:
said applying step includes applying said input voltage pulse via a de-multiplexing process; and
said sampling step includes receiving said output voltage via a multiplexing process.

10. The method of claim 1, wherein:
said electrodes define a plurality of parallel tracks; and
said electric fields extend between adjacent parallel tracks.

11. The method of claim 1, wherein:
said electric fields extend between electrodes of a first set of substantially parallel tracks that includes said first electrode and electrodes of a second set of substantially parallel tracks that includes said second electrode; and
said second set of substantially parallel tracks are substantially orthogonal to said first set of substantially parallel tracks.

* * * * *